J. M. ROBERTS.
LAND LEVELER.
APPLICATION FILED OCT. 23, 1912.
1,073,287.
Patented Sept. 16, 1913.
3 SHEETS—SHEET 1.
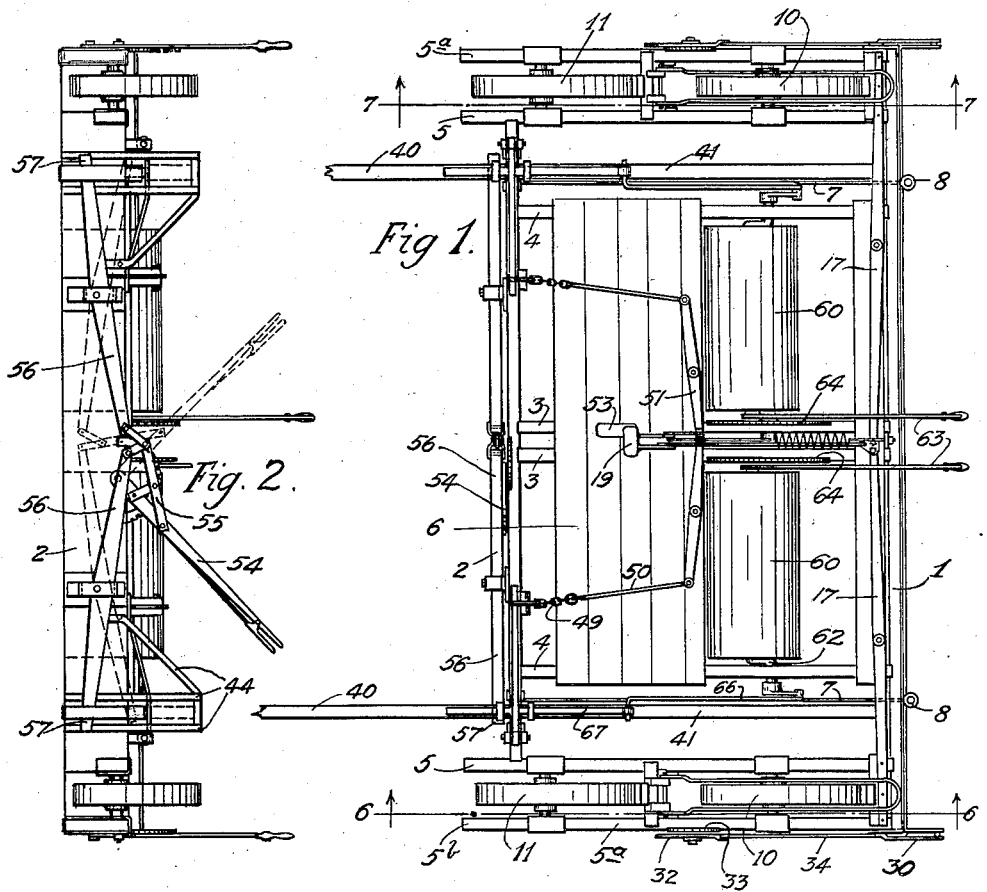
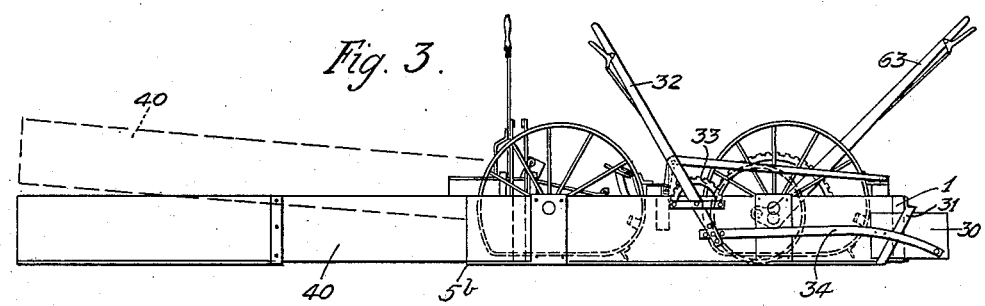
Witnesses:
E. D. Haines.
O. Van Loock.
Inventor:
Jesse Martin Roberts
By H. B. Willson & Co.

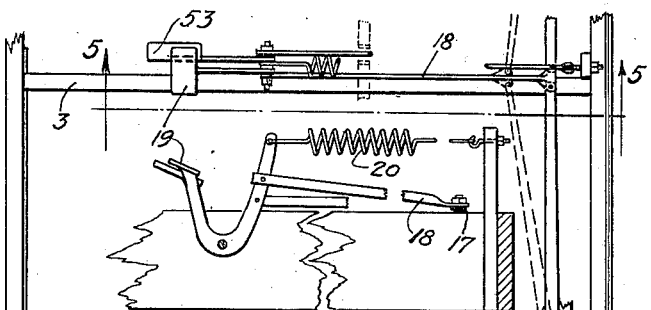
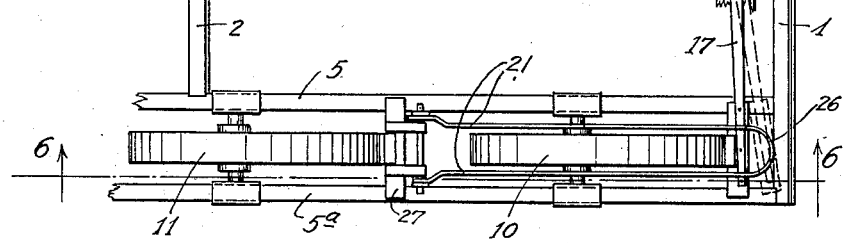
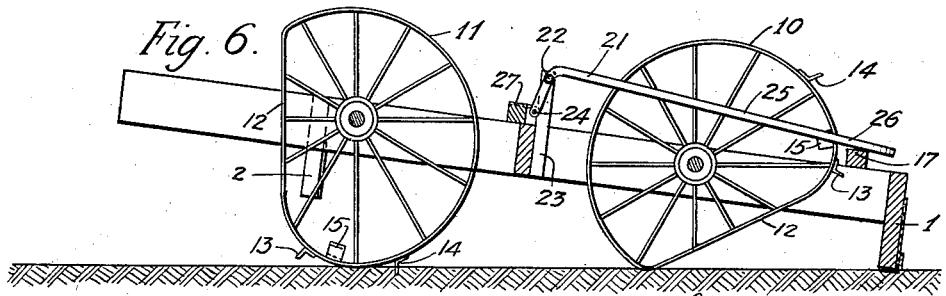
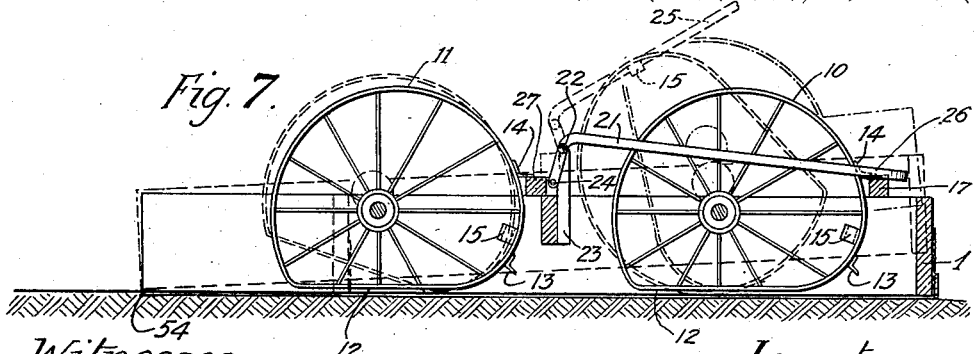
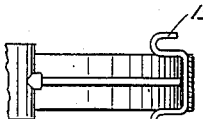

J. M. ROBERTS.
LAND LEVELER.
APPLICATION FILED OCT. 23, 1912.
1,073,287.
Patented Sept. 16, 1913.
3 SHEETS—SHEET 3.
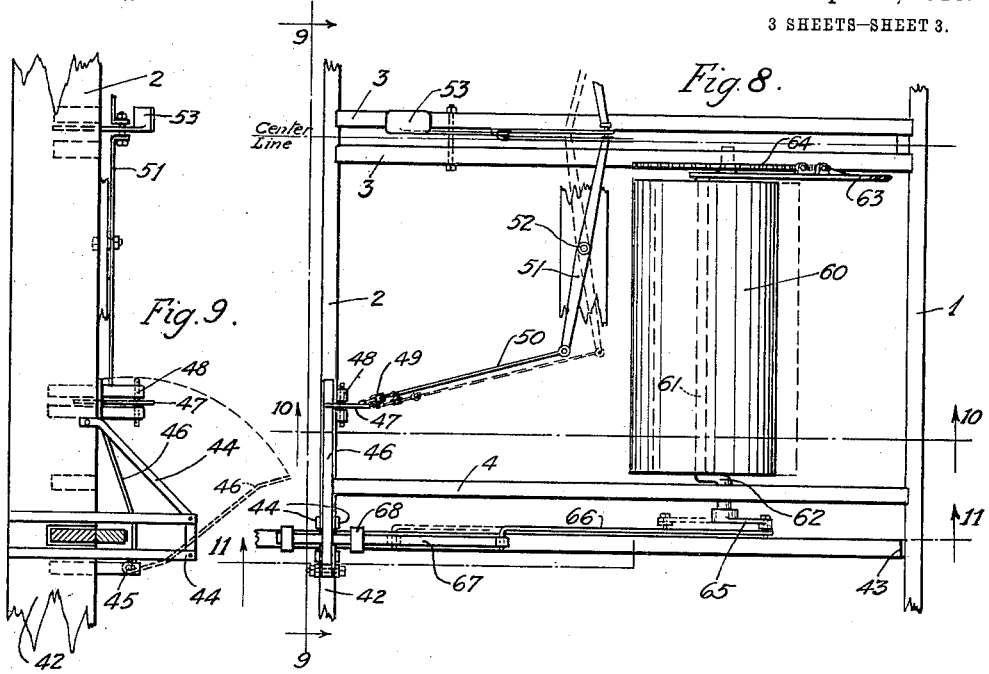
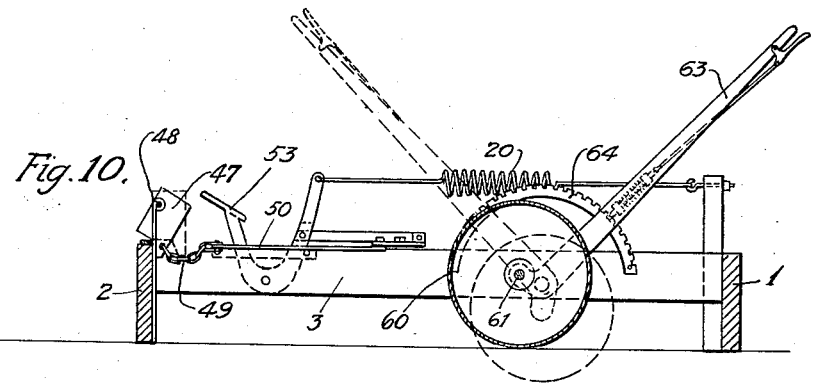
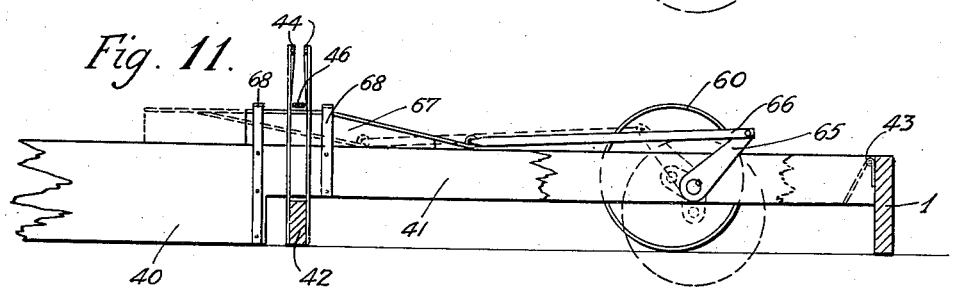
Witnesses:
E. D. Haines
A. Van Loock
Inventor:
Jesse Martin Roberts
By H. B. Willson & Co

UNITED STATES PATENT OFFICE.

JESSE MARTIN ROBERTS, OF LOS ANGELES, CALIFORNIA.

LAND-LEVELER.

1,073,287.  Specification of Letters Patent.  Patented Sept. 16, 1913.

Application filed October 23, 1912. Serial No. 727,286.

*To all whom it may concern:*

Be it known that I, JESSE MARTIN ROBERTS, a citizen of the United States, residing at Los Angeles, in the county of Los Angeles and State of California, have invented certain new and useful Improvements in Land-Levelers; and I do declare the following to be a full, clear, and exact description of the invention, such as will enable others skilled in the art to which it appertains to make and use the same.

This invention relates to excavating, and more especially to scrapers; and the object of the same is to produce a land leveler which includes a pair of blades or scrapers carried by a framework supported in such manner that the driver may cause the scrapers to rise by automatic support of wheels and pass over the borders in leveling alfalfa or grain land in preparation for irrigation. This object is carried out by the special construction hereinafter more fully described and claimed, and shown in the drawings wherein—

Figure 1 is a plan view of this machine complete, Fig. 2 a rear elevation thereof and Fig. 3 a side view thereof. Fig. 4 is an enlarged plan view of one front corner of the framework, illustrating the wheels at one side of the machine; and Fig. 5 is a sectional detail of the foot lever for tripping said wheels, taken on the line 5—5 of Fig. 4. Fig. 6 is a section on the line 6—6 of Fig. 4, Fig. 7 a similar section with the parts in slightly different position, and Fig. 7ª is a detail which will be referred to hereinafter. Fig. 8 is a plan view of a part of the machine, and Figs. 9, 10 and 11 are sectional views on the lines 9—9, 10—10 and 11—11 thereof.

The framework of this machine which may well be made of wooden members connected by bolts or otherwise, includes a main or front scraper 1 which I have heretofore made of a 2x12 timber twelve feet long standing on edge and faced with metal, a rear scraper 2 which may well be a timber of the same dimension but somewhat shorter and which I prefer to dispose about six feet in rear of the front scraper, a pair of beams connecting said scrapers at the transverse center of the machine and which I will call the central sills 3, other longitudinal beams connecting said scrapers at points near the sides of the machine and which I will call the side sills 4 and a pair of beams 5 and 5ª extending to the rear from each end of the front scraper 1 outside the wings yet to be described, the outer beams 5ª form the sills for the runners—the extremities of the rear scraper being connected with the inner beam 5 of each of these pairs. Beam 5 is made of 2″x6″ and 5ª of 2″x12″ timbers. The main framework is shown in Fig. 1 as having a deck or platform 6 on which the operator stands (or may be seated), and this platform may be elaborated or reduced although I would prefer that the structure be as open as possible in order that the operator may observe what is taking place. The parts of this framework will be suitably braced by means not necessary to amplify, and the proportions hereinbefore given are only suggestive. By preference I extend eye-bolts 7 longitudinally through the framework at proper points, not only for strengthening the same but because the eyes 8 may be caused to stand at the front as shown in Fig. 1 and will serve as means for attaching the draft, whatever the latter may be. A machine of approximately the dimensions given could be drawn over the plowed ground by eight horses unless the ground were exceedingly rough, but it is clear that with rougher ground or a larger machine more horses must be employed or other and stronger power. It is intended that the machine shall move straight to the right as seen from above in Fig. 1, the front face of its main scraper 1 doing the bulk of the work. But in leveling alfalfa or grain land in preparation for irrigation it is desirable to go crosswise with the borders so that the dirt may be brought from the centers of the lands to level up the low places along the border; it then becomes desirable to drop the dirt on the borders while leveling the land between them, and it is then desirable that the machine shall be lifted completely over a border without destroying the same, and these possibilities my leveler possesses. While ordinarily and usually it travels with the lower edges of its scrapers in contact with the ground, it has lifting mechanism duplicated within the beams 5 and 5ª as will now be described.

Each runner (see Sheet 2 of the drawings) has journaled between its beams 5 and beams 5ª front and rear wheels 10 and 11, and in the machine I have constructed each wheel is of sixteen inch radius hung on an axis about two inches to the rear of the center and a fraction of an inch toward its flat or mutilated surface 12; and each wheel has on its periphery a spur 13 at the end of its medium radius, a stop 14 at its longest radius slightly in rear of the spur, and a pair of laterally projecting hooks 15 between said spur and stop and standing within its peripheral line. Pivoted at 16 on the framework is a lock lever 17 whose outer end stands beneath the stop 14 to hold the wheel at rest when the flat side 12 of the wheel is beneath as seen in Fig. 7, and the inner ends of the two levers 17 are connected by a rod 18 with a foot lever 19 (see Fig. 5) which may be actuated by bearing downward on its foot piece or pedal but which is normally thrown forward by means of a spring 20 so that the outer ends of the two lock levers are caused to engage the stops 14 of the two front wheels 10. Normally the flat surfaces 12 of both wheels is carried about two inches above the ground between the two beams 5 and 5ª, but when it is desired to have the front end of the machine and the forward scraper 1 rise so that they may pass over a border the operator depresses the pedal 19 and moves the lock levers 17 to the position shown in dotted lines in Fig. 4, when the front wheels 10 tip downward until their spurs 13 engage the earth so that they are caused positively to start on their rotation as indicated by the dotted lines in Fig. 7. A similar lock 27 engages the stop 14 of the rear wheel 11, but this lock is moved forward along the upper edges of the beams 5 and 5ª by a trip lever 21 pivoted at 22 in a standard 23 rising from the beams 5 and 5ª its rear end being connected at 24 with said lock 27, and its side bars 25 passing astride the front wheel 10 above its hub and around in front of it as at 26 where it overlies the lock lever 17; and as the front wheel rotates to the first dotted position shown in Fig. 7, the hooks 15 engage the side bars 25 of the trip lever 21 so that its front end 26 is raised and its rear end at the point 24 draws the lock 27 forward. This releases the stop 14 of the rear wheel 11 and the latter may then make a similar revolution excepting of course that it is timed to follow the revolution made by the front wheel. It is to be understood that the other pair of wheels at the opposite side of the machine are moving in synchronism with the pair we are discussing. It follows that when the operator has depressed the pedal 19 and trip mechanism, the revolution of the front wheels 10 first lifts the front end of the machine to the first dotted position and eventually to the highest dotted position in Fig. 7, and as the machine moves forward it may pass over a border; then the trip levers release the rear wheels, and in their revolution they lift the rear end of the machine as seen in Fig. 6 while the forward wheels are permitting the front end of the machine to drop again into contact with the earth, and thereby the rear end of the machine passes over the border and the latter is left uninjured, both wheels coming to rest with their stops 14 upon their locks 17 and 27 so that the scraping can proceed uninterruptedly until the operator again depresses the pedal 19.

For confining the earth which accumulates in front of the forward scraper 1 so as to prevent it from slipping off the extremities thereof, I provide each end of the machine with a knife or blade 30 slidably mounted under a guide 31 against the outside of the outermost beam 5ª, and when projected forward this knife serves also to straighten the edge of any border or to cut off surplus dirt, carry it forward, and distribute it evenly over the land in front. When the knife is not desired it may be retracted by means of a hand lever 32 having a proper latch moving over a toothed segment 33, the lower end of this lever being connected by a rod 34 with the knife or blade 30. The forward progress of the machine thus causes the front scraper 1 to cut off the high spots in the land and the earth thus gathered is carried along with the machine until it passes over the low spots into which the accumulations fall in a manner which will be clear. Of course when the machine is caused to pass over a border in the manner above described, it leaves its accumulations on the near side of the border because the front scraper rises from behind such accumulations. At all times, however, the rear scraper follows the front one and supplements and completes its work, and for the purpose of confining the accumulations so that they will not be dissipated laterally I provide wings which will now be described.

Each wing is by preference made of 2x12 inch lumber standing on edge, and approximates fourteen feet in length, its body 40 in rear of the rear scraper trails or drags normally over the surface of the earth, but the lower half of its front end 41 is cut away as seen in Fig. 11 so that the extremity 42 of the rear scraper (which in turn is cut away at its upper half) may pass beneath it as shown in Figs. 9 and 11; and the front extremity of the wing is hinged at 43 to the front scraper 1. Rising from the end of the rear scraper is an open guide 44 within which at 45 is pivoted a latch 46 which overlies the upper edge of the wing, and the inner end of said latch when depressed falls behind a lock 47 pivoted at 48 within a standard rising from said scraper. The lock may well be of the configuration illustrated in Fig. 10, so that its weight normally throws its nose over the tip of the latch, and it is withdrawn from locking position by means of a chain or linked connection 49 between it and a rod 50, the forward end of the latter being connected through a rock lever 51 pivoted at 52 on the framework or platform, with a foot lever or pedal 53 which underlies the pedal 19 as best seen in Fig. 1. When the pedal 53 is depressed the locks 47 are swung forward so as to free the latches 46 and the two wings 40 may rise around their hinges 43; when the wings descend the latches turn on their pivots 45 and their tips automatically engage beneath the locks 47. When the pedal 19 is depressed to actuate the lifting mechanism in the manner above described, it depresses the pedal 53 and unlocks the latches 46 in the same manner, and this is necessary because in the movements of the main frame indicated by the dotted lines in Fig. 7 it is desirable that the frame shall rise at its front end around the point 5$^b$ rather than around the rear extremities of the wings, and it is also desirable when the frame assumes the position shown in Fig. 6 that the wings shall rise so as to be lifted over the border.

For lifting the rear ends of the wings at times when the main framework is not passing over a border or other elevation, I provide the mechanism best seen in Fig. 2. This consists of a hand lever 54 having a catch moving over a toothed segment as usual, and this lever connected by links 55 with two rock levers 56 centrally pivoted in suitable supports on the framework, and each having its outer end 57 passed through a hole in or otherwise engaged with the body 40 of the wing at a point somewhat in rear of the rear scraper 2. By properly manipulating the lever 54, the rock levers are turned on their pivots and their outer ends 57 raised; and this movement raises the wings 40 irrespective of the action of the main frame, although of course the latches must first be tripped. This action will lift the rear ends of the wings from one inch to fourteen inches if desired, and it is of great convenience in handling the leveler and especially in turning around. Otherwise and at other times the long trailing wings slide upon the surface of the earth and prevent the lateral dissipation of the material accumulated by the scrapers—confining it in a channel as it were, if there be surplus dirt left in front of the rear scraper after it has passed. But the greatest utility of the long wings is that they prevent the comparatively small framework from dropping into unimportant depressions in the surface, and thereby they serve to assist in accomplishing the object of a leveler which is to level the ground by causing its scraping mechanism to move along the same in a substantially and practically horizontal path, no matter what the topography may be. If it were not for the presence of these wings when the machine approached a small rise in the ground its first scraper would pass over it and then its second and, while perhaps it smoothed the surface, it would not carry the little rise into the next valley; with the addition of these wings, however, the object sought is attained.

For elevating the framework and both scrapers and also for pulverizing the ground I preferably employ a pair of rollers 60, one disposed to either side of the central sills 3, through which, and through the side sills 4, their supporting shafts 61 are journaled. Each shaft is cranked near its outer edge as at 62 so that the rollers are offset from the direct line of the bearings in which the shaft is mounted, and hand levers 63 moving over suitable toothed segments 64 control the swing of the cranked shafts in their bearing and hence the rise and fall of the rollers within the frame work as best seen in Fig. 10. It is obvious that when the rollers are raised, the scrapers and runners rest on the ground; when the rollers are depressed, the framework is raised more or less off the ground so that the accumulations within or forward of it may be allowed to sift through it more or less rapidly to fill up unevennesses which may be encountered as the machine progresses over the surface. If the accumulations are forward of the main scraper 1, not only are they allowed to drop into the uneven places in the surface, but the rollers in passing over them will pulverize or crush the lumps and compact the earth as is desired. I prefer to dispose the rollers separately in the two sides or halves of the framework, as best illustrated in Fig. 1, and provide each with a hand lever 63 so that they may be manipulated separately; however, if desired these rollers may be mounted on a single shaft and then one hand lever only will be needed.

In the preferred form of my machine embodying all the details hereinbefore set forth, there will be so many levers and pedals to be actuated by the operator (or by two operators if there be two) that the platform 6 must be of sufficient size to enable him or them to reach the various levers—therefore it is quite probable that there will be no seat as above was suggested.

For crushing the clods or lumps of earth in advance of the scraping or leveling thereof, as is sometimes desirable, I provide the following construction: On the shaft of each roller is a crank, shown at 65 in Fig. 11, and the upper end of this crank is connected by a rod 66 with a wedge 67 sliding in guides 68 carried by the wing 40 at either side of the guide 44 in which the latch 46 moves. The construction is such that when the roller is lowered as suggested above and as shown in dotted lines in Fig. 11, the crank and rod push the wedge to the rear and its lower or thinner portion comes under the latch 46 so that the latter no longer holds the wing depressed. The descent of the roller raises the front scraper 1, which therefore does not touch the ground, and the forward progress of the machine brings the roller first into contact with the clods or lumps of earth which are crushed, then the rear scraper levels them off and fills the low places, and still the lower edges of the wings trail along on the ground in the manner above described. When this detail of construction is not desired, it is only necessary to disconnect the rod 66 from the crank 65 so that the thicker or higher portion of the latter underlies the latch 46, when the latch will have its movement and function as described above. Here again I have shown one of these wedges and its actuating mechanism at each side of the machine, although if the roller shafts are rigidly connected and actuated by a single hand lever 63, both cranks 65 and both wedges will be moved simultaneously.

It is to be understood that while I have shown the complete machine as possessing the various characteristics and details of constructions above set forth, some or several of them may be omitted if a cheaper type of machine is preferred, or some of the details may be replaced by equivalent elements of different constructions. Obviously the sizes, shapes, proportions and materials of parts are not essential to the successful operation thereof.

What is claimed as new is:

1. In a machine of the class described, the combination with the framework, earth treating devices carried thereby, and longitudinal beams along each side of said framework; of two wheels mounted tandem alongside each beam, and each wheel having one flat side, means for locking the wheels with their flat sides downward, and manually controlled means for tripping the locking means.

2. In a machine of the class described, the combination with the framework, earth treating devices carried thereby and longitudinal beams along each side of said framework; of two wheels mounted tandem alongside each beam and each wheel having one flat side, means for locking the wheels with their flat sides downward, manually controlled means for tripping the locking means of the front pair of wheels and tripping mechanism for the locking mechanism of the rear pair of wheels controlled by the action of the forward tripping mechanism.

3. In a machine of the class described, the combination with the framework, earth treating devices carried thereby, and longitudinal beams along each side of said framework; of two wheels mounted tandem alongside each beam and each wheel having one flat side, independent locking mechanisms for holding the front pair of wheels with their flat sides downward and the rear pair of wheels with their flat sides downward, manually controlled means for tripping the front locking mechanism, hooks on the front wheels, and pivoted trip levers connected with said rear locking mechanism and adapted to be actuated by the rise of said hooks as the forward wheels rotate.

4. In a land leveler the combination with the framework having longitudinally spaced beams along its sides, runners carried by the outer beams and front and rear scrapers carried by said framework; of two wheels mounted tandem between the beams along each side, and each wheel having one flattened side with a spur projecting from its periphery forward of said side and a stop yet forward of said spur, locks extending across the beams forward of the wheels and adapted to engage said stops when the flattened sides of the wheels are beneath, and means for tripping said locks.

5. In a land leveler, the combination with the framework having longitudinal runners along its sides, and front and rear scrapers carried by said framework; of two wheels mounted tandem between the pair of beams along each side and each wheel having one flattened side with a stop projecting from its periphery forward of said side, locks extending across the runners forward of the wheels and adapted to engage said stops when the flattened sides of the wheels are beneath, and means for tripping said locks.

6. In a land leveler, the combination with the framework having runners adapted to travel along the ground, the scraping devices between said runners, and longitudinal wings projecting to the rear from the framework, of a pair of mutilated wheels mounted tandem on each runner and each having one flattened side and a variable radius which is the greatest just forward of said side, the latter when at the bottom of the wheel standing higher than the shoes of the runners, means for holding the wheels in this position, and means for tripping said holding means to permit the wheels to make one revolution each, for the purpose set forth.

7. In a land leveler, the combination with the framework having runners adapted to travel along the ground, the scraping devices between said runners, longitudinal wings projecting to the rear from the framework, means on the framework for lifting the rear ends of said wing when the rear end of the framework rises, and independent means for manually raising the rear ends of said wings; of a pair of mutilated wheels mounted tandem on each runner and each having one flattened side and a variable radius which is greatest just forward of said side, the latter when at the bottom of the wheel standing higher than the shoes of the runners, means for holding the wheels in this position, and means for tripping said holding means to permit the wheels to make one revolution each, for the purpose set forth.

8. In a land leveler, the combination with the framework having runners adapted to travel along the ground, the scraping devices between said runners, longitudinal wings projecting to the rear from the framework, means on the framework for lifting the rear ends of said runners when the rear end of the framework rises, latches for holding said wings depressed, locks for holding said latches in active position, and manually controlled means for tripping said locks; of a pair of mutilated wheels mounted tandem on each runner and each having one flattened side and a variable radius which is greatest just forward of said side, means for holding the latter at the bottom of the wheel, and means for tripping said holding means to permit the wheels to make one revolution each, for the purpose set forth.

9. In a land scraper, the combination with the framework having runners adapted to travel along the ground, the scraping devices between said runners, longitudinal wings projecting to the rear from the framework, means on the framework for lifting the rear ends of said wings when the rear end of the framework rises, a guide rising from each side of the framework, a latch pivoted at its outer end and movable within said guide across the upper edge of one wing and holding its body depressed, and manually controlled means for holding the inner end of said latch locked in position to engage said wing; of a pair of mutilated wheels mounted tandem on each runner and each having one flattened side, and means for tripping said holding means to permit the wheels to make one revolution each, for the purpose set forth.

10. In a land leveler, the combination with a substantially rectangular framework having a main scraper across its front end and a rear scraper across its rear end, and longitudinal runners along its sides; of wings hinged to said main scraper inside said runners and extending past said rear scraper, the wing bodies standing on edge and their front ends being reduced and overlying the extremities of said rear scraper, means for holding said wings depressed with their lower edges in the plane of the lower edges of said runners and scrapers, and means for raising the rear ends of said wings when said holding means are unlocked.

11. In a land leveler, the combination with a substantially rectangular framework having a main scraper across its front end and a rear scraper across its rear end, and longitudinal runners along its sides; of wings hinged to said main scraper inside said runners and extending past said rear scraper, the wing bodies standing on edge and their front ends being reduced and overlying the extremities of said rear scraper, means for holding said wings depressed into the plane of said runners and scrapers, means for raising the rear ends of said wings when said holding means are unlocked, a transverse roller disposed within said framework, and means for depressing its axle relatively to the framework, for the purpose set forth.

12. In a land leveler, the combination with a substantially rectangular framework having a main scraper across its front end and a rear scraper across its rear end, wings hinged to said main scraper and extending past said rear scraper, and latches connected with said framework and overlying said wings; of a transverse roller disposed within said framework, means for depressing its axle relatively to the framework, and means for interrupting the engagement of said latch with the wings when said roller is depressed.

13. In a land leveler, the combination with a substantially rectangular framework having a main scraper across its front end and a rear scraper across its rear end, wings hinged to said main scraper and extending past said rear scraper, and latches connected with said framework and overlying said wings; of a transverse roller disposed within said framework, means for depressing its axle relatively to the framework, guides rising from each wing, a wedge moving through said guides and beneath said latch, a crank on the shaft of the roller, and connections between said crank and wedge whereby the thin end of the latter is moved under the latch when the roller is depressed, for the purpose set forth.

14. In a land leveler, the combination with a substantially rectangular framework having a main scraper across its front end and a rear scraper across its rear end, wings hinged to said main scraper and extending past said rear scraper, and latches connected with said framework and overlying said wings; of a transverse roller disposed within said framework, means for depressing its axle relatively to the framework, means for interrupting the engagement of said latches with the wings when said roller is depressed, locks engaging the free ends of said latches, and manually controlled trip mechanism for moving said locks irrespective of the action of the rollers.

In testimony whereof I have hereunto set my hand in presence of two subscribing witnesses.

JESSE MARTIN ROBERTS.

Witnesses:
CYRUS B. LAKIN,
HAZEL PIXLEY.

Copies of this patent may be obtained for five cents each, by addressing the "Commissioner of Patents, Washington, D. C."